April 22, 1958 B. I. BUCK 2,831,518
TOMATO CORING AND PARING MACHINE
Original Filed March 23, 1950 9 Sheets-Sheet 1
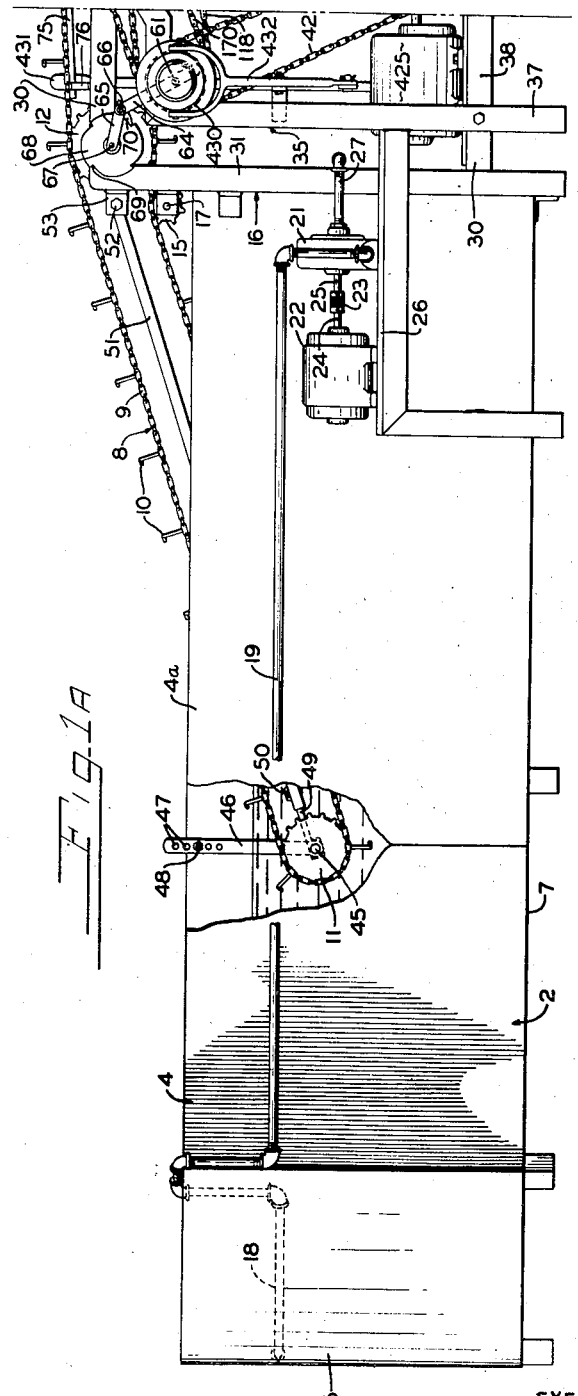
INVENTOR.
H. BEALE ROLLINS
BY EXECUTOR OF THE ESTATE
BENJAMIN I. BUCK, DECEASED
DES JARDINS, ROBINSON & KEISER
HIS ATTORNEYS

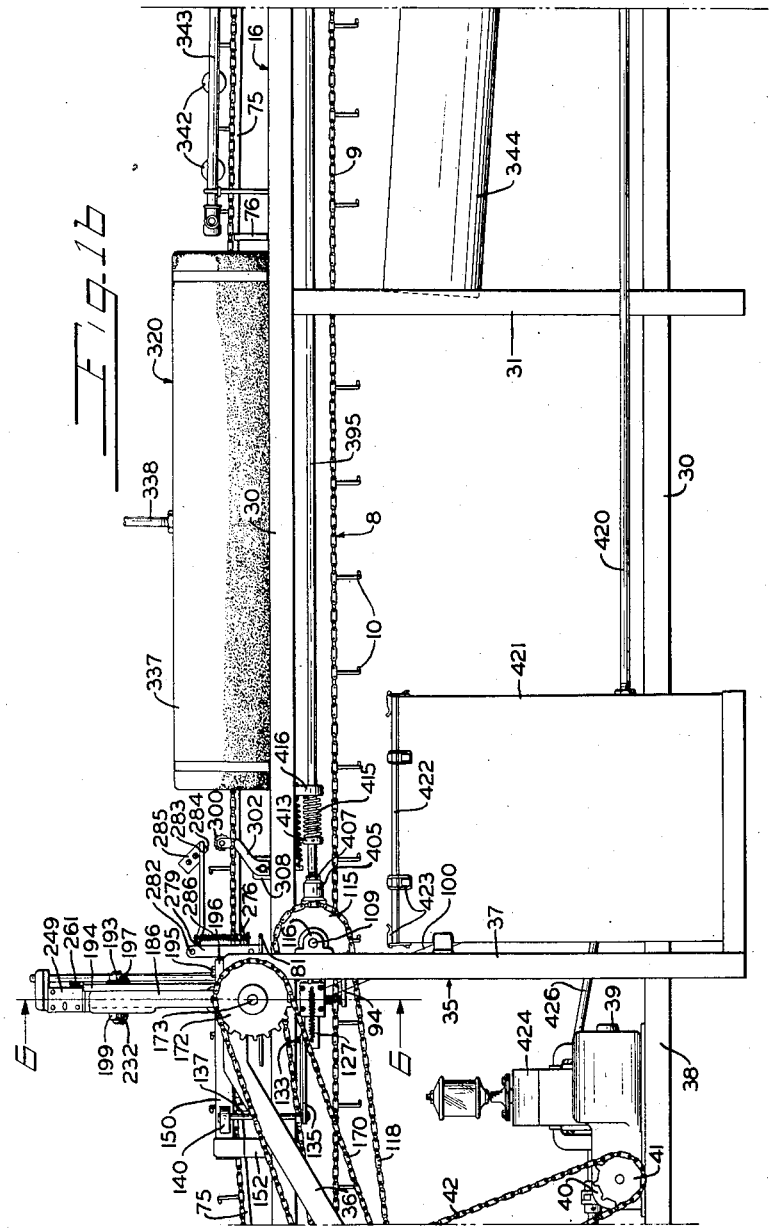

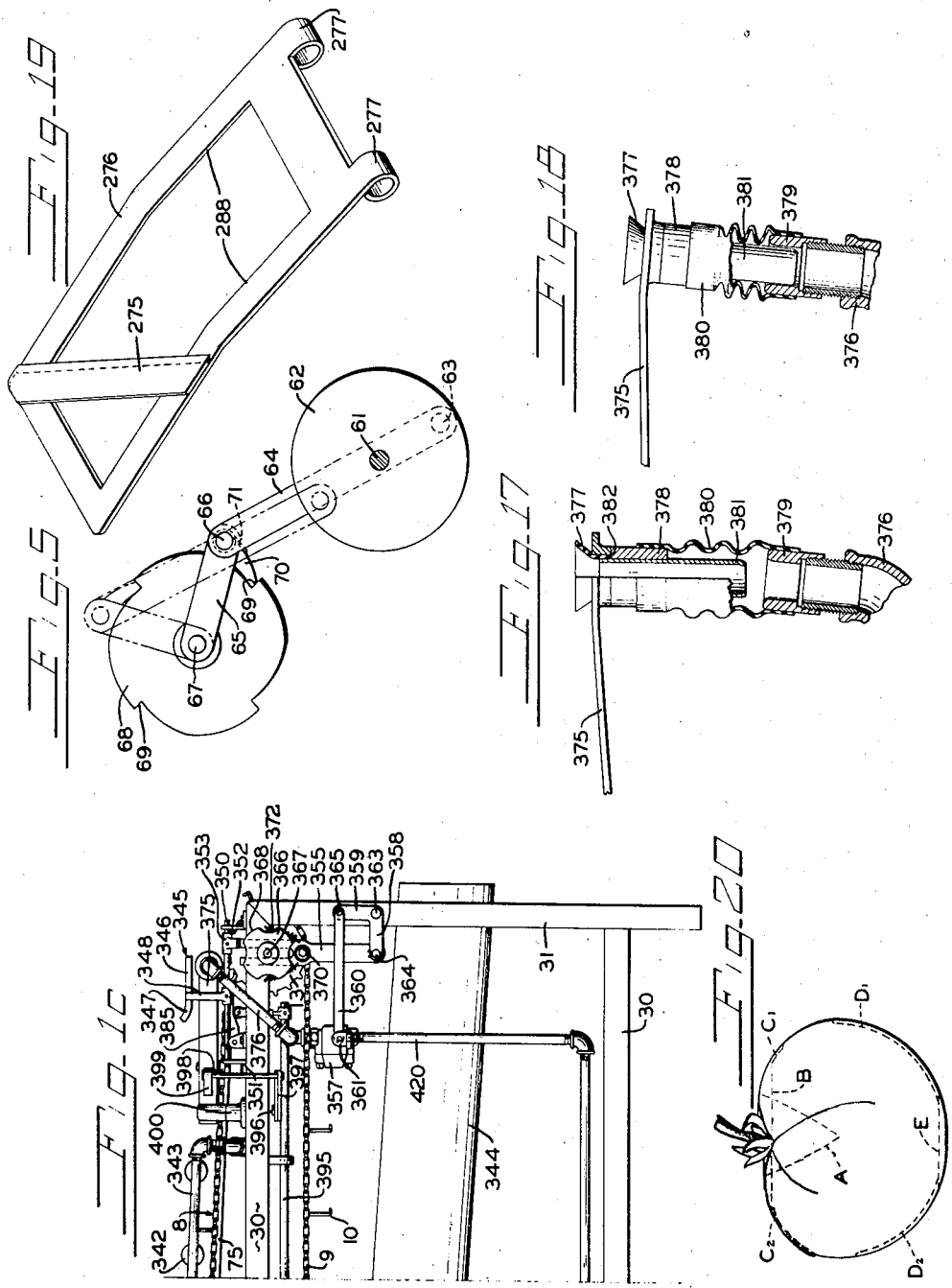

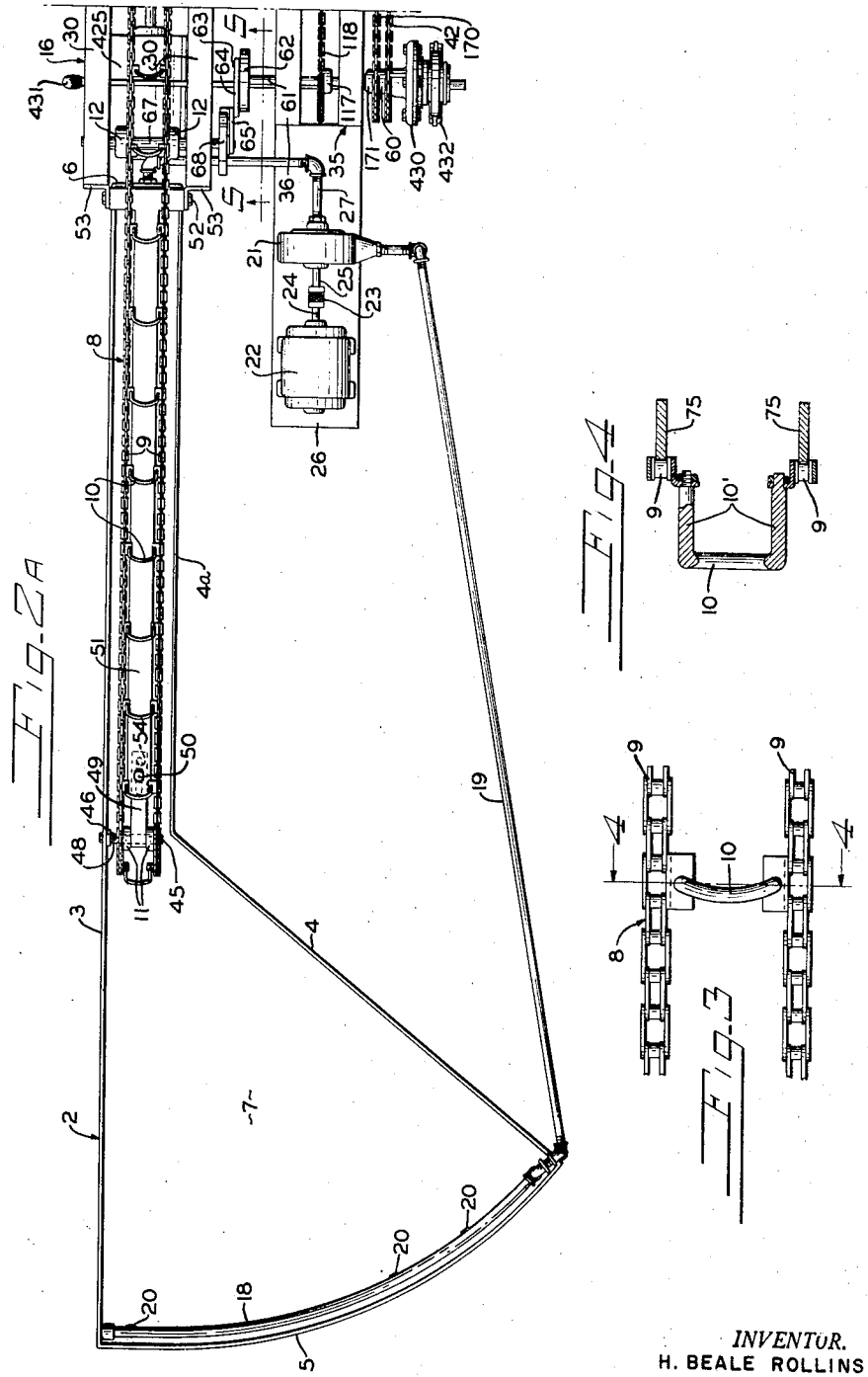

April 22, 1958 B. I. BUCK 2,831,513
TOMATO CORING AND PARING MACHINE
Original Filed March 23, 1950 9 Sheets-Sheet 5
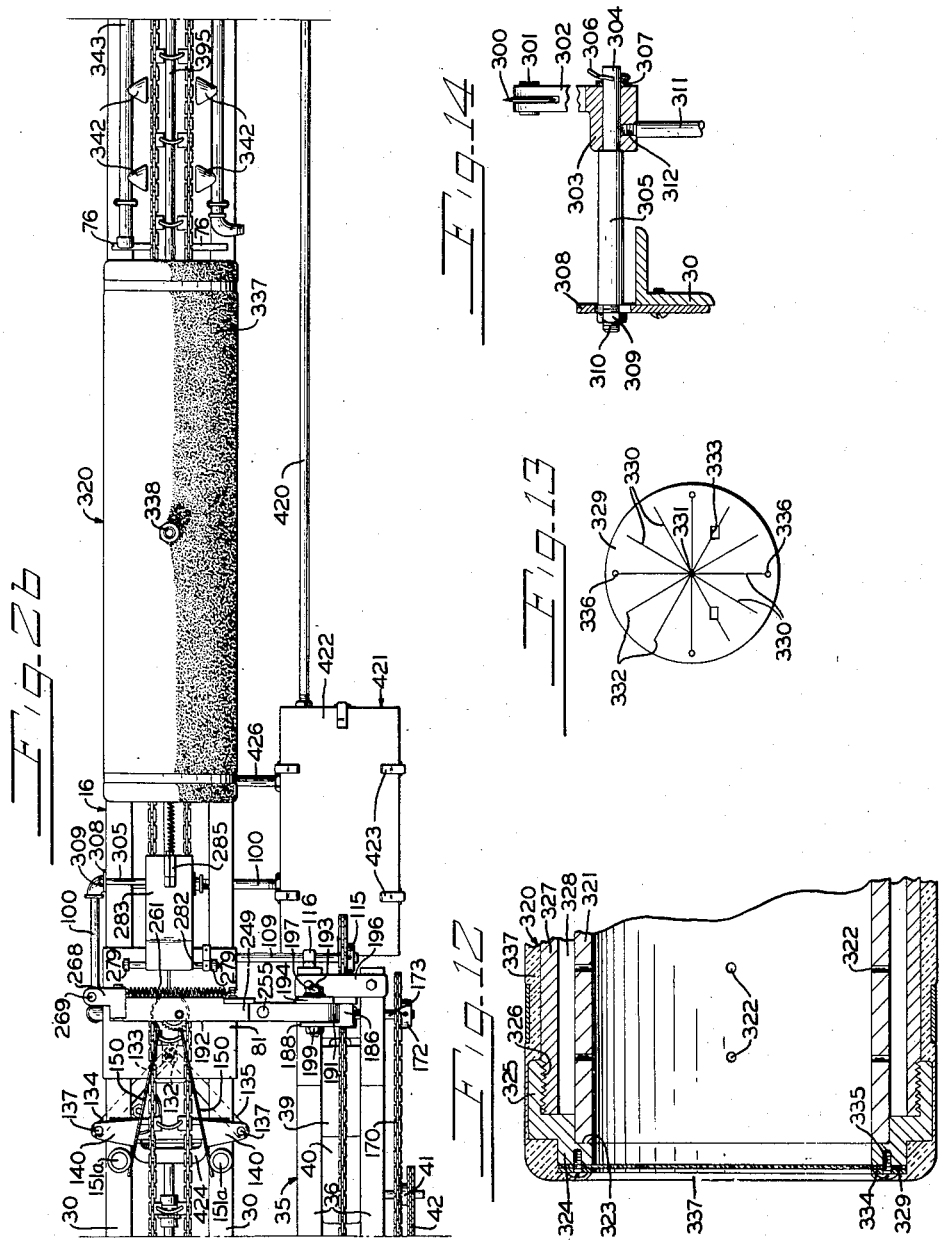
INVENTOR.
H. BEALE ROLLINS
EXECUTOR OF THE ESTATE
BY BENJAMIN I. BUCK, DECEASED
DES JARDINS, ROBINSON & KEISER
HIS ATTORNEYS

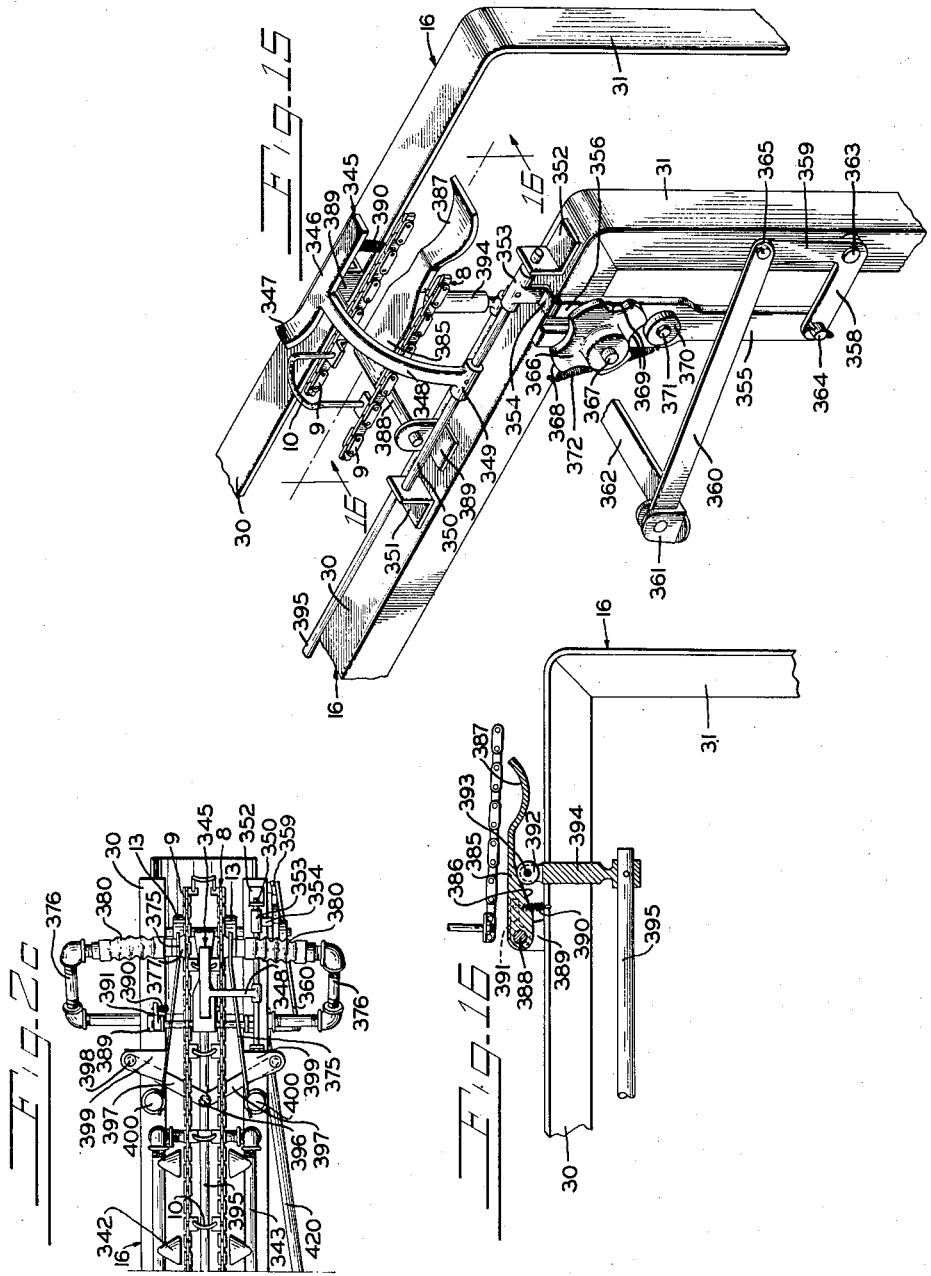
April 22, 1958     B. I. BUCK     2,831,518
TOMATO CORING AND PARING MACHINE
Original Filed March 23, 1950     9 Sheets-Sheet 6
*INVENTOR.*
H. BEALE ROLLINS
EXECUTOR OF THE ESTATE
BY BENJAMIN I. BUCK, DECEASED
DES JARDINS, ROBINSON & KEISER
HIS ATTORNEYS April 22, 1958

B. I. BUCK 2,831,518

TOMATO CORING AND PARING MACHINE

Original Filed March 23, 1950

*INVENTOR.*
H. BEALE ROLLINS
EXECUTOR OF THE ESTATE
BY BENJAMIN I. BUCK, DECEASED

DES JARDINS, ROBINSON & KEISER

HIS ATTORNEYS

April 22, 1958  B. I. BUCK  2,831,518
TOMATO CORING AND PARING MACHINE
Original Filed March 23, 1950  9 Sheets-Sheet 8
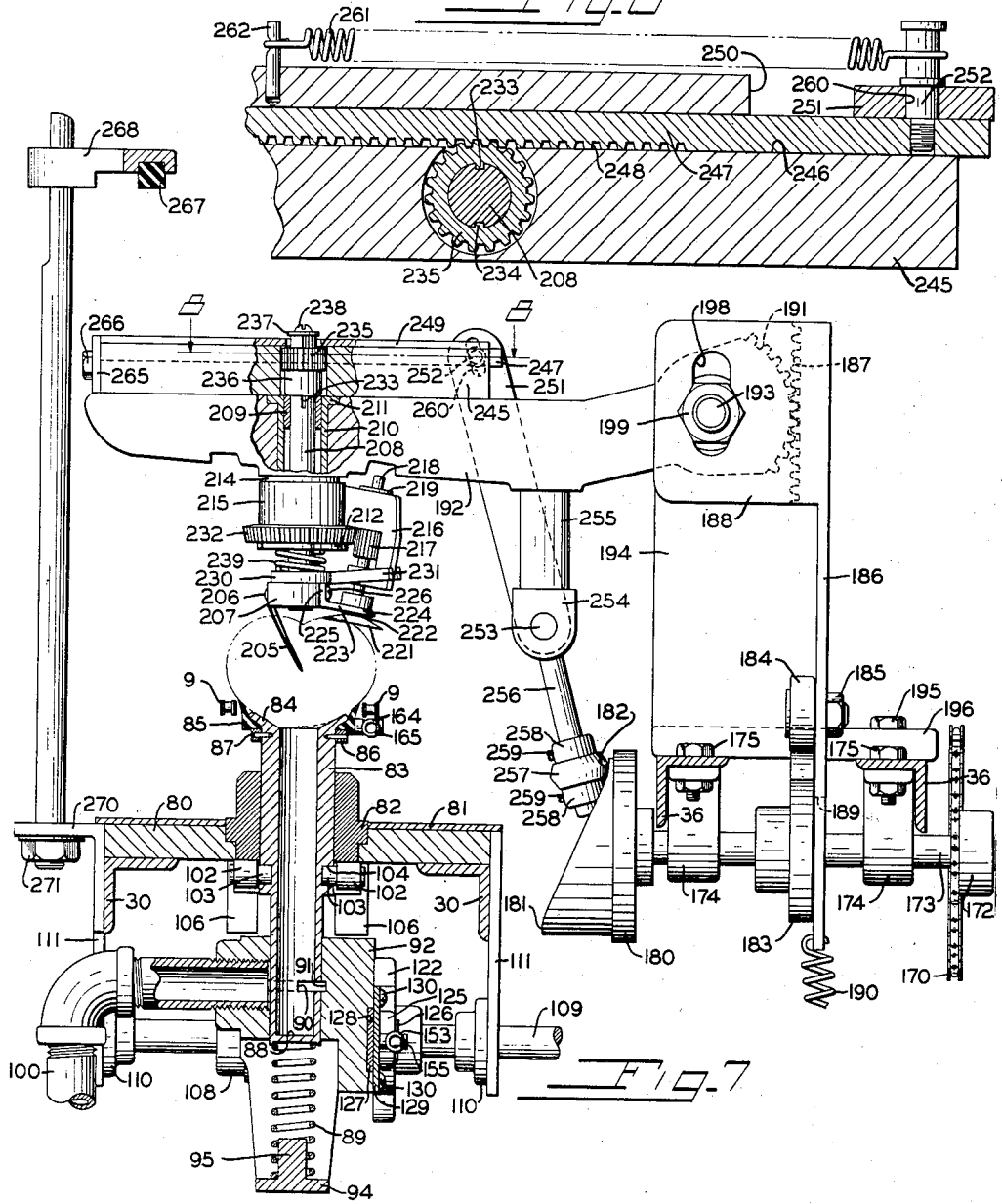
INVENTOR.
H. BEALE ROLLINS
EXECUTOR OF THE ESTATE
BY BENJAMIN I. BUCK, DECEASED
DES JARDINS, ROBINSON & KEISER
HIS ATTORNEYS April 22, 1958
B. I. BUCK
2,831,518
TOMATO CORING AND PARING MACHINE
Original Filed March 23, 1950
9 Sheets-Sheet 9
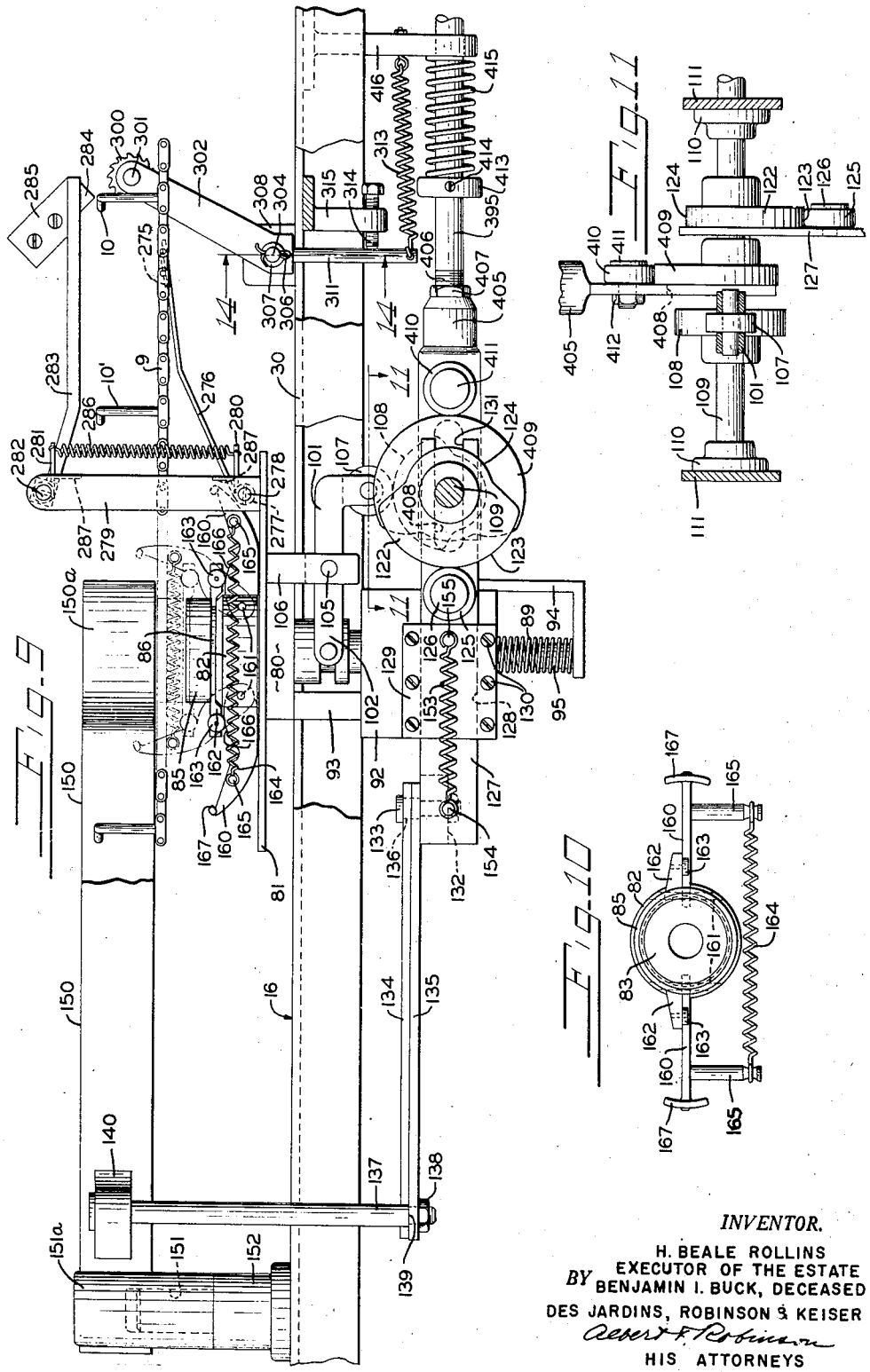
INVENTOR.
H. BEALE ROLLINS
EXECUTOR OF THE ESTATE
BY BENJAMIN I. BUCK, DECEASED
DES JARDINS, ROBINSON & KEISER
HIS ATTORNEYS

United States Patent Office 2,831,518
Patented Apr. 22, 1958

2,831,518

TOMATO CORING AND PARING MACHINE

Benjamin I. Buck, deceased, late of Baltimore, Md., by H. Beale Rollins, executor, Baltimore, Md., assignor of one-half to H. Beale Rollins, Baltimore, Md.

Original application March 23, 1950, Serial No. 151,469, now Patent No. 2,703,123, dated March 1, 1955. Divided and this application February 23, 1955, Serial No. 490,048

20 Claims. (Cl. 146—52)

This invention relates to an improved tomato skinning machine and has to do, more particularly, with an apparatus for removing skins from tomatoes by the application of suction to the sides thereof.

This application is a division of application Serial No. 151,469, filed March 23, 1950 (Patent No. 2,703,123 dated March 1, 1955), which was a continuation-in-part of application Serial No. 707,848, filed November 5, 1946, and now abandoned.

The problem of removing skins from tomatoes is a difficult one because of the marked irregularity in shape and size of tomatoes. The principal object of this invention, therefore, is to provide a machine for automatically skinning tomatoes, which will be effective and efficient in removing skins from tomatoes of varying shapes and sizes.

A further object of the invention is to provide a machine for automatically removing the skins from tomatoes, which is more effective and efficient than any tomato paring machine heretofore proposed.

Another object of the invention is to provide an automatic machine for removing the skins from, and coring, tomatoes and which will deliver the tomatoes ready for canning or other processing.

A further object of the invention is to provide an automatic machine for removing skins from tomatoes by the application of suction to opposite sides thereof.

Another object of the invention is to provide an automatic machine for removing skins from tomatoes by the application of suction, in which the tomato is subjected to preparatory operations conditioning the skin for removal by suction.

A further object of the invention is to provide an automatic machine for skinning tomatoes in which the skin of the tomato is conditioned, by slitting or cutting at various points to form two oppositely disposed side sections of skin, which may be removed by the application of suction to opposite sides of the tomato.

Another object of the invention is to provide such an automatic machine for skinning tomatoes in which, after being subjected to slitting operations, and preparatory to the application of suction, the tomato is subjected to steaming and cooling operations to loosen the skin sections thereof.

Another object of the invention is to provide a tomato skinning machine in which the tomatoes are carried by a conveyor to and past various operating stations, and which includes means for automatically loading the tomatoes on the conveyor, stem end uppermost.

Further objects, and objects relating to details of construction and economies of operation, will appear from the detailed description to follow. In one instance, the objects of the invention have been accomplished by the device and means described in the following specification. The invention is clearly defined and pointed out in the appended claims. A construction constituting a preferred embodiment of the invention is illustrated in the accompanying drawings, forming a part of this specification, in which:

Fig. 1a is a side elevation of one part, including the receiving end, of a tomato skinning machine embodying the invention.

Fig. 1b is a side elevation of an intermediate part of the machine, continuing from the right hand end of Fig. 1a.

Fig. 1c is a side elevation of the discharge end of the machine, continuing from the right hand end of Fig. 1b.

Fig. 2a is a top plan view of the part of the machine shown in Fig. 1a.

Fig. 2b is a top plan view of the part of the machine shown in Fig. 1b.

Fig. 2c is a top plan view of the part of the machine shown in Fig. 1c.

Fig. 3 is an enlarged plan view of a portion of the endless chain conveyor, including one of the flights.

Fig. 4 is a cross sectional view, taken on line 4—4 of Fig. 3.

Fig. 5 is an enlarged detail view of the intermittent drive for the conveyor.

Fig. 7 is a view substantially like Fig. 6, but with the parts in different operating positions.

Fig. 8 is an enlarged sectional view taken on line 8—8 of Fig. 7.

Fig. 9 is an enlarged, detail side elevational view of an intermediate portion of the machine.

Fig. 10 is a top plan view of a device for positioning the tomato with its stem end vertically centered.

Fig. 11 is a view taken on line 11—11 of Fig. 9.

Fig. 12 is an enlarged view of one end portion of the steam chamber.

Fig. 13 is a detail elevation view of the closure for the end of the steam chamber.

Fig. 14 is a sectional view, taken on line 14—14 of Fig. 9.

Fig. 15 is an enlarged perspective view of the discharge end of the machine.

Fig. 16 is a sectional view, taken on line 16—16 of Fig. 15.

Fig. 17 is an enlarged detail view, partly in section, of the connection of the end of a vacuum conduit to one of the wing plates, shown in the position it occupies when the conveyor is at rest but no tomato is between the wing plates.

Fig. 18 is an enlarged view, corresponding to Fig. 17, the wing plate being shown in a position that it would assume when a tomato is between the wing plates.

Fig. 19 is an enlarged perspective view of the end shearing blade and its mounting on its supporting frame, and Fig. 20 is a view of a typical tomato indicating thereon, in dotted lines, the location of the various cuts or slits made in the tomato skin, to prepare it for removal by the application of suction.

In the drawings, the same reference numerals refer to the same parts throughout the several views and the sectional views are taken looking in the direction of the arrows at the ends of the section lines.

Figure 6:
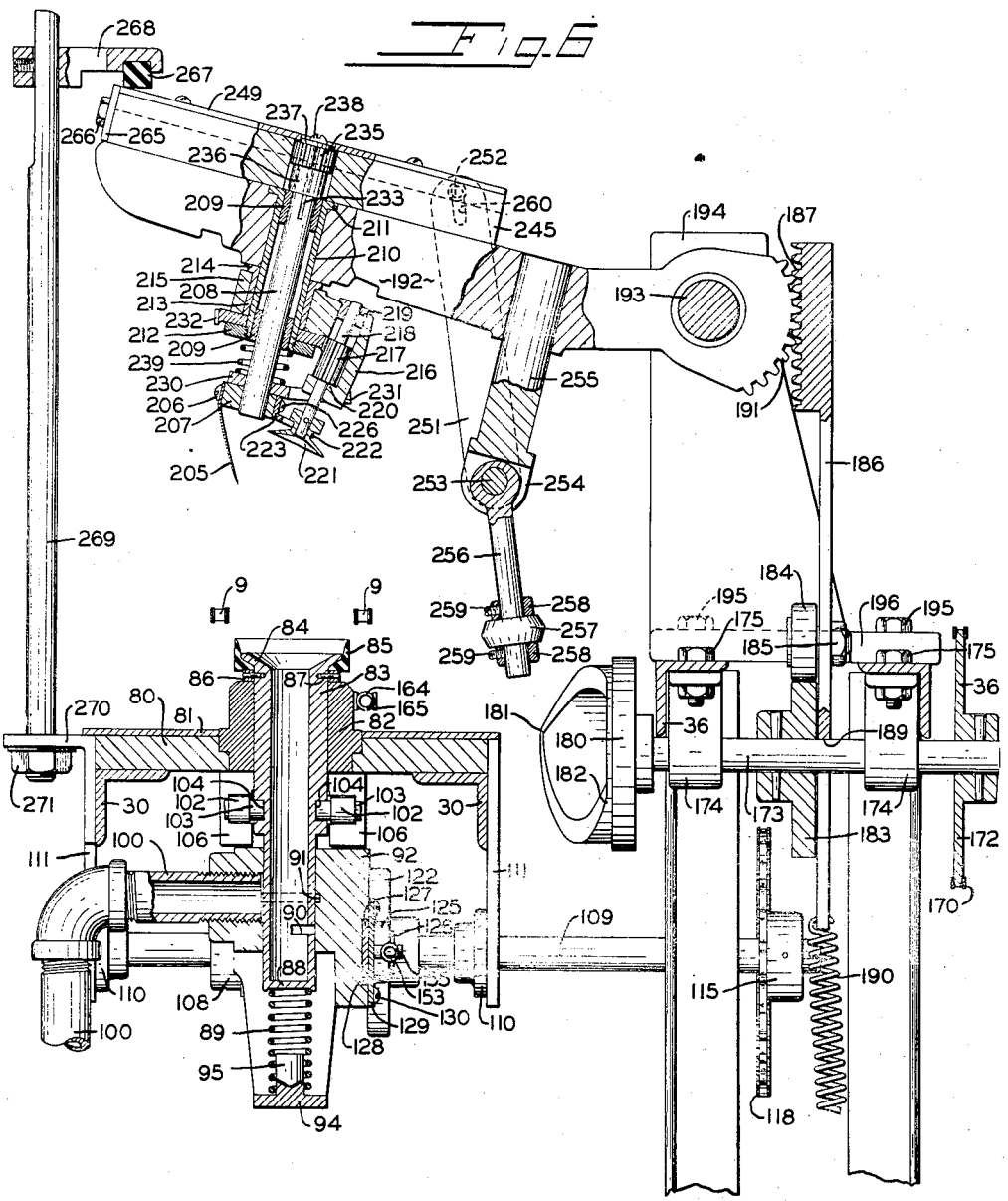
Fig. 6 is an enlarged sectional view, taken in the direction of the arrows on line 6—6 of Fig. 1b, showing the coring device.

In general, the tomato skinning machine embodying the invention contemplates the removal of the tomato skin by the application of suction to opposite sides of the tomato, and the preparation of the tomato skin for such removal by slitting or cutting it at appropriate points to form two opposite skin sections, which may be separated from each other and removed from the tomato by the application of suction. To accomplish this, there is contemplated an intermittently operating conveyor, which carries the tomatoes one by one, stem side uppermost, to and past successive operating stations at which various operating instrumentalities are effective to prepare the skin for removal and, finally, for the application of suction to remove the skin sections.

In general, the tomato skinning machine of the invention contemplates an intermittently operating conveyor on which the tomatoes are supported, in spaced relation, with the stem end uppermost, and by which the tomatoes are carried to and past several operating stations at which various operations are performed on the tomato, all of which condition it for the final operation of removing the skin sections by the application of suction to opposite sides of the tomato. The tomato is first presented at the coring station, at which a coring knife is caused to operate on the upper central portion of the tomato to cut out the core or stem section thereof and, at the same time, a knife operates on the upper surface of the tomato to cut off a section of skin forming a zone or band surrounding the stem. The object of this is to free the tomato skin surrounding the stem. At this station, the tomato is preferably lifted automatically from the conveyor, centered vertically and held during the coring and stem end paring operation by suction applied to the bottom of the tomato. After the tomato leaves this coring station, the conveyor carries it past a bottom slicing knife, which automatically cuts a thin slice of skin from the bottom of the tomato, thus freeing the skin at the bottom or blossom end. The conveyor, next, carries the tomato past slitting devices, which slit the tomato skin, fore and aft, in a plane substantially midway between the sides of the tomato, whereby the tomato skin is slit to form substantially two diametrically opposed side sections, still adhering to the body of the tomato. These slicing and slitting operations are essential to prepare the tomato skin for subsequent removal by suction applied to opposite sides thereof. Upon leaving the slitting devices, the tomato is carried by the conveyor through a steaming chamber, in which it is subjected to live steam to scald the tomato and loosen the skin thereon. Upon leaving the steaming chamber, the tomato is carried by the conveyor through a cooling and rinsing spray, upon leaving which the tomato has been prepared for the removal of the skin sections by the application of suction. Finally, the conveyor brings the tomato, thus prepared, to the skin removing station at which vacuum conduits are automatically applied to opposite sides of the tomato and, being connected with a source of suction, they tear apart the skin sections and remove the sections from the tomato, permitting the skin removed to pass off through the vacuum conduits. Preferably, the tomato is lifted slightly from the conveyor at the skin removing station. It is preferred to provide means by which the vacuum conduits will not be connected with a source of suction when the conveyor, at rest, presents no tomato in position to be engaged by the vacuum conduits for the application of suction thereto. After this final operation, the skinned and cored tomato may be removed or discharged from the conveyor in any desirable manner.

The improved tomato skinning machine preferably includes a device for automatically loading tomatoes on the conveyor, in spaced relation, with the stem end uppermost. For this purpose, it is proposed that an upwardly inclined stretch of the conveyor shall be disposed in a channel-like portion of the tank in which a supply of tomatoes is floating in water. These will float with the stem end uppermost and means may be provided for creating a current in the water which will float the tomatoes into the channel-like part of the tank, so that they will be engaged successively by successive flights on the conveyor, as it rises from the liquid in the tank, thus automatically loading the conveyor with tomatoes arranged in spaced relation and with the stem end uppermost.

Referring to the numbered parts of the drawings, there is shown (Figs. 1a and 2a) an open top tank 2 comprising a narrow channel portion leading out from a triangular gathering area, all being surrounded by side walls 3, 4 and 4a, end walls 5 and 6, and a bottom wall 7. The tank is of substantial width and depth for receiving a supply of water, or other liquid, in which tomatoes are floated with their stem ends up and their blossom ends down, and then, as thus floated, are arranged automatically in spaced relation upon an endless conveyor 8.

This endless conveyor is composed of a pair of endless chains 9 which are arranged side by side in spaced-apart parallel relation and connected by arched flights 10 to form individual recesses or pockets along the conveyor in which the tomatoes are received and supported, one at a time. Each flight comprises two spaced outwardly-extending legs 10', the inner ends of which are rigidly connected to opposite links of chains 9, and the outer ends of which are connected by a curved cross bar. Thus, a tomato may rest on and be supported by chains 9 while its rear side is engaged by the transversely-extending arched flight, which carries the tomato along with the conveyor. This permits certain devices to act on the lower portion of the tomato, between the chains, while the tomato rides on and is carried along by the conveyor.

Each of the chains 9 passes over and around a set of sprockets 11, 12 and 13 (Figs. 1a and 1c), these two sets of sprockets being arranged side by side, in spaced relation. Sprockets 12 are driven, by driving mechanism hereinafter described, and sprockets 11 and 13 are idlers. There is another idler sprocket 15 (Fig. 1a), for each chain, mounted on some part of the frame 16 in position to hold the lower stretch of the chain in mesh with the under side of driven sprocket 12. Each of these idlers 15 is mounted on a stub shaft 17, the ends of the two stub shafts being spaced to allow the arched flights 10 to pass freely between the two idlers.

The side wall 4a of tank 2 lies parallel to part of the opposite side wall 3, and is spaced therefrom to provide a narrow rectangular channel in which one portion of the conveyor is mounted, extending upwardly and forwardly from the sprockets 11 near the bottom of the tank to the sprockets 12 above the forward end of the tank. The triangular gathering area of the tank is defined by side wall 4, extending at an angle to wall 4a, arcuate end wall 5 and the rear portion of side wall 3. Thus, a funnel-like gathering area is formed leading to the channel-like portion between walls 3 and 4a. At or near the liquid level along the inner side of the end wall 5, there is a conduit 18, connected to a water supply line 19, and having a plurality of jets or nozzles 20, disposed along the length of the end wall and directed forwardly, for circulating the water in the tank from the nozzles toward the channel portion and the throat of the triangular gathering area, thereby urging the floating tomatoes into the channel to be picked up, one at a time, by the flights 10 of the conveyor 8, as it rises above the water level. The water supply line 19 is connected to a circulating pump 21, driven by any suitable means, such as an electric motor 22 operatively connected through suitable driving connections 23, between the motor shaft 24 and the pump shaft 25. The motor 22 and pump 21 are mounted upon a table or shelf 26. Another water line 27 connects the pump intake with the opposite end of the tank, near the forward end of the channel. Thus, the water is circulated through the tank from the rear end wall 5 of the triangular gathering area, toward the throat of the gathering area, through the channel to the point where the conveyor emerges above the water level, and then returned by pump 21 to be recirculated through the tank.

If the tomatoes are of such condition that they will not float on the surface of a body of water, salt may be dissolved in the water to increase the specific gravity of the liquid. It has been found that the solution of salt in the water, in the proportion of one pound of salt to twelve gallons of water will give a liquid of such specific gravity as to float any tomatoes likely to be met with in the practical use of this machine. It should be understood that the weight is so distributed in tomatoes that they will normally float with the stem end uppermost. Hence, if a supply of tomatoes is dumped into the liquid in tank 2, they will all arrange themselves stem end up, and the currents in the water will carry them into the narrow channel portion between walls 3 and 4a, where they will be picked up one by one by successive flights 10 of conveyor 8, as it rises from the liquid in the tank.

Adjacent the end wall 6 of the tank 2, there is the end of a frame 16 comprising a plurality of longitudinally disposed angle irons 30 mounted upon vertical standards or legs 31. The longitudinal angle irons extend from the end of the tank to the discharge end of the machine and have mounted thereon the various operating devices hereinafter described. There is a supplemental frame 35, located at one side of the main frame, for supporting certain portions of the mechanism. This supplemental frame comprises a pair of top angle irons 36, fixed at their oppsite ends to two vertical standards or legs 37. One or more cross angle irons 38 are attached to opposite vertical standards 37 of the supplemental frame for supporting a motor 39, which has a gear reducing head 40, to which is connected a sprocket 41 over which passes the sprocket chain 42. The pairs of longitudinally-disposed angle irons of both the main frame and the supplemental frame are spaced apart and secured together by any number of cross pieces (not shown). The two frames are also spaced apart and preferably attached together by cross pieces (not shown). The cross pieces help to rigidify the two frames, and hold them in position in respect to each other.

The main frame is substantially higher than the tank, and that portion of the conveyor between sprockets 11 and 12 is inclined, the sprockets 11 being in such position that the rear end of the conveyor 8 is submerged at the desired distance below the liquid level in tank 2. The sprockets 11 are mounted on a shaft 45, which is journaled at the bottom of an adjustable bar 46, the opposite end of the bar being provided with a series of spaced holes 47 for receiving a bolt 48, by which it is fixed to wall 3 of the tank. This shaft 45 also passes through and is journaled in the end of an extension 49, which is adjustably coupled by bolt 50 to the end of the bar 51, pivoted at its opposite end by bolt 52 to brackets 53 that are fixed to the frame 16. The end of the extension 49, to which the bar 51 is bolted, has an elongated slot 54 formed therein, through which the bolt projects for being clamped, with the extension adjusted to any desired length by reason of the slot.

The conveyor moves along the length of the main frame to carry the tomatoes, which have been collected from the tank, past various operating devices, and, as above mentioned, the conveyor is driven by sprockets 12. Power is transmitted to these driven sprockets 12 by sprocket chain 42 which passes over sprocket 60, fixed on shaft 61, and driven sprocket 41. There is fixed on one end of the shaft 61 a disc 62 (Fig. 5) having a pin 63, eccentrically disposed on one face, which is pivotally connected, to one end of link 64 the other end of which is pivotally connected at 66 to one end of link 65, pivoted on shaft 67, to which are fixed the drive sprockets 12. Also fixed to this shaft 67, is a ratchet wheel 68 having four ratchet teeth 69 disposed about its periphery, for engagement by a pawl 70, which is pivoted on pin 66, and is normally urged into engagement with the ratchet by a spring 71. This pawl and ratchet mechanism is to provide an intermittent drive for the conveyor, which is so timed that the conveyor advances during a predetermined interval and then remains at rest for a like interval, the timing and the spacing of flights 10 on conveyor 8 being such that, during the interval of rest, tomatoes will be presented at certain operating stations for treatment thereat. The movement of the intermittent drive, in its cycle of operation, is illustrated in Fig. 5. In the phantom line position, the pawl 70 has just become engaged with one of the ratchet teeth 69. It is then moved by the disc 62 and connected links 64 and 65 to the full line position, and then returned idly for engagement with the next tooth thereby turning the ratchet through a quarter turn for each complete revolution of disc 62. It is obvious from the above description, that the sprockets 12, fixed to the shaft 67, will move the conveyor a distance depending on the extent to which the sprockets 12 have been turned. Since the conveyor is relatively long, and consequently somewhat heavy, a rail 75 is preferably disposed beneath each chain to keep the conveyor from sagging, these rails 75 being supported by brackets 76 attached to frame 16.

The first operating station is the coring station, at which the stem, and the core portion surrounding the stem, is removed from the tomato. The toughest part of the skin of the tomato is at its top surface surrounding the stem, and, while the tomato is being cored, this tough skin portion is cut away to free the tomato skin at the stem end. This operation is referred to as the stem end paring operation.

A tomato on the conveyor will first pass to the coring station and, when it has moved into a proper position, the conveyor stops, and the tomato is lifted from it and supported while being cored and also while a belt of skin is pared from its top end surrounding the core. The mechanism for effecting this comprises generally a supporting mechanism and a coring and stem end paring mechanism.

The supporting mechanism lifts the tomato from the conveyor 8 and aligns it vertically, the stem end up, so that it is in proper position for the coring and paring mechanism to operate. This supporting mechanism comprises a base plate 80 (Figs. 6 and 7) seated on the longitudinally-disposed angle irons 30 of the main frame 16. Another base plate 81 is superimposed on plate 80 and attached thereto by any suitable means. Press fitted within a recess of the plates 80 and 81 is a collar 82, which has a hollow post 83 mounted therein for vertical reciprocation. A rubber ring 85 surrounds the upper end of tubular post 83, being clamped between a collar 86, pinned at 87 to the post, and outwardly flaring flange 84 of the post. The upper edge portion of ring 85 is tapered and deformable, so that the ring may make contact with a tomato after the manner of a vacuum cup. The bottom end of the tubular post is closed by wall 88, which has one end of a compression spring 89 seated thereagainst, the lower end of the post being slightly recessed to center the spring. A slot 90 is cut in the side wall of the post 83 in a position to move in and out of registration with an annular groove 91 formed in a valve block 92, in which the post 83 reciprocates.

The valve block 92 is fixed to the base plate 80 by support strips 93 (Fig. 9), secured to said plate and block. There is an angle bracket 94 (Fig. 6), having one arm attached to the valve block 92 and another arm projecting beneath the lower end of post 83, but spaced therefrom, for supporting the lower end of spring 89, the opposite end of which is seated, as above described, against the bottom of the post 83. A lug 95 is fixed to the angle bracket and projects within the adjacent end of spring 89 for centering it. Threaded into one side of the valve block 92 is a conduit 100, which is connected to a source of suction or vacuum hereinafter described and the conduit 100 communicates with the groove 91 in the valve block.

Each time that a tomato is moved by the conveyor to the coring station, it is to be lifted into position for the coring and stem end paring operation, and the post 83 is to be elevated to bring the slot 90 into alignment with the groove 91 in the valve block, and this is accomplished by mechanism caused to operate at this time. It will be noted, in Fig. 6, that the upper end of post 83, and rubber ring 85, are located between the vertical planes of the parallel conveyor chains 9, so that the ring may move between the chains to lift the tomato, as shown in Fig. 7, the tomato, when at rest at this station, being vertically aligned with post 83. This lifting mechanism comprises a lever 101 (Fig. 9) having a forked end 102 with a pin 103 in each arm of the fork engaging an annular groove 104 (Fig. 7) in the outer wall of post 83. The lever 101 is pivoted at 105 (Fig. 9) to a bracket 106 that is fixed to the base plate 80. The opposite end of lever 101 is bent downwardly and has a roller 107 journaled thereon in position for operation by a cam 108 fixed to a shaft 109, journaled in bearings 110 (Fig. 7) carried by supports 111 fixed to angle irons 30. This shaft 109 extends beyond the main frame 16 to provide an end on which is fixed a sprocket 115 (Fig. 1b). A bearing 116, fixed to a vertical standard 37 of the supplemental frame, supports the extended end of shaft 109. This sprocket 115 is in alignment with sprocket 117, on shaft 61, and connected therewith by a sprocket chain 118 for driving shaft 109. Shaft 61 is driven continuously by motor 39 through sprocket chain 42, causing, at each revolution of the sprocket 117, the post 83 to be raised and lowered for lifting a tomato from the conveyor to the corer and then replacing the cored tomato on the conveyor. Spring 89, acting on the lower end of post 83, holds roller 107 in contact with edge cam 108, and the latter is of such form that, when the conveyor comes to rest, spring 89 is permitted to raise post 83 and, shortly before the conveyor starts to move after its period of rest, cam 108 lowers the post, it being held elevated during the period of rest by a dwell on cam 108.

A pair of clamping wings 150 is provided which are adapted to engage a tomato at the coring and paring station, from opposite sides, after the tomato has been lifted by the devices just described, and to hold it firmly centered under the coring and paring device. Each wing 150 is pivoted at one end by a vertical pin 151, rising from a standard 152, fixed to angle iron 30, having a bearing in an ear 151a fixed to the outer side of the wing. Each wing 150 extends from its pivot forwardly of the conveyor and the forward end thereof has a curved recess 150a formed therein (see Figs. 2b and 9) for engaging and clamping the lifted tomato at the coring and paring station. Each wing 150 has fixed thereto an outwardly extending lug 140, slightly in front of its pivot, in which are mounted downwardly-extending pins 137. The lower end of each pin 137 has a shoulder 139 engaging the rear end of a link, 134 or 135, and clamped thereto by nut 138. Links 134 and 135 extend forwardly and converge, their forward ends being pivotally connected by a stud 133 screwed into block 132 on a slide 127, said stud having an upper portion loosely fitting in holes in the forward ends of said links. Slide 127 is slidably mounted in guide slot 128 of valve block 92 and confined in the slot by cover 129 secured to the valve block by screws 130. Slide 127 has a slot 131 providing clearance for shaft 109 and the sides of the slot serve as an additional guide for the slide. A contact roller 125, journaled on pin 126 fixed to slide 127, engages an edge cam 122, fixed on shaft 109 and having high and low cam surfaces, 123 and 124. A tension spring 153 is connected, at its rear end, by pin 154 to slide 127 and, at its forward end, by pin 155 to cover 129, and tends to move slide 127 to the right (Fig. 9) until roller 125 engages cam 122.

Fig. 2b shows these parts with the clamping wings 150 in clamping position engaging a tomato, at the coring and paring station and lifted slightly from the conveyor chains 9 toward the coring device. Fig. 9 shows the parts with the wings in releasing position, such as they occupy when the conveyor is moving a tomato from one operating station to another. When the conveyor is in motion the high cam surface 123 is active and holds the slide 127 to the left (Fig. 9) against the tension of spring 153, so that the free ends of wings 150 are forced apart by links 134 and 135 and a tomato can be moved freely between them. The timing of cam 122 is such that, when the conveyor is at rest and the low portion of cam 108 becomes effective to permit a tomato at the coring station to be lifted, the low cam surface 124 of cam 122 becomes effective to permit slide 127 to move to the right under the tension of spring 153 to move the free ends of wings 150 toward each other to engage and clamp the lifted tomato. Shortly before the tomato is lowered after the coring and paring operation, the high cam surface 123 becomes effective to move slide 127 to the left, separating the free ends of wings 150 and releasing the tomato.

It is important for the tomato to be in vertical alignment when it is subjected to the corer so that the stem will be in proper position to be cut out by the corer. This objective is obtained by a pair of jaws 160, each pivoted at 161 to the collar 82 (Fig. 9). Collar 86 (Fig. 6), mounted on post 83, has a pair of oppositely disposed ears 162 (Fig. 9) each carrying a roller 163 journaled thereon. There is a coiled spring 164 having its ends attached to the jaws 160 by pins 165 which project therefrom, for continuously urging the free ends of the jaws toward each other. When the tomato lifting post 83 is in its lowest position, rollers 163 contact the jaws 160 at points 166, as shown by solid lines in Fig. 9, thereby holding the jaws open with the free ends apart, and, when post 83 is raised to lift the tomato from the conveyor, the rollers 163 release the jaws 160, thereby allowing them to take the position shown in phantom lines in Fig. 9, by reason of the spring 164. In this position, the tomato is grasped by the curved ends 167 (Fig. 10) of the jaws and held with the stem end of the tomato vertically aligned.

After the tomato has been lifted from the conveyor 8 by the post 83, a coring mechanism is caused to operate on the tomato. This coring mechanism is driven by a sprocket chain 170 (Fig. 6), which passes over sprocket 171 on shaft 61 (Fig. 2a), and sprocket 172, fixed to shaft 173 (Fig. 1b), which is journaled in bearing blocks 174 (Fig. 6) bolted at 175 to the angle irons 36 of the supplemental frame 35. A face cam 180 is fixed to the end of this shaft 173, said cam having a high point 181 and a low point 182, disposed to contact parts of the coring mechanism hereinafter described. Another cam 183 is fixed to this shaft 173 is position for its edge to contact a roller 184 that is journaled at 185 on a slide 186, having, at one end, a rack 187, adjacent an ear or lug 188, which is disposed at right angles thereto (Fig. 7). This slide 186 is reciprocated by the cam 183 to move the rack 187 back and forth. The opposite end of this slide 186 is slotted at 189 to straddle the shaft 173, and it is constantly urged downwardly by a spring 190 having one end attached thereto and its opposite end attached to the frame. This rack 187 meshes with the gear teeth 191 that are hobbed in the end of a supporting lever 192, which is pivoted at 193 to a bracket 194 bolted at 195 (Fig. 6), through the flanged foot 196 of the bracket, to the top of the supplemental frame 35. The pivot pin 193 is in the form of a bolt having one end clamped to the bracket 194 by nut 197 (Fig. 2b) and its opposite end working in an elongated slot 198 (Fig. 7) in the ear 188 on the slide 186 and held in place by the nut 199.

The free end of the supporting lever 192 is normally disposed upwardly at a slight angle to the pivoted end, as shown in Fig. 6, but arranged to be in a horizontal plane when lowered to operative position, as shown in Fig. 7. A rotatable coring means is supported on the underside of the free end of the supporting lever 192, and connected with suitable driving mechanism, also mounted on the arm, to be driven by the face cam 180 on shaft 173. This coring means comprises a projecting blade 205, disposed tangentially to a circle having its center in the pivot 193, for being inserted into the stem end of the tomato to cut out a core of conical shape around the stem, when revolved about the axis of shaft 208. This blade is fastened by one or more screws 206, to a collar 207 that is fixed to the lower end of a shaft 208, journaled in a pair of bushings 209 that are pressed into the opposite ends of a sleeve 210, having an upper flange 211, which sleeve extends transversely of, and is fixed in, the lever 192. There is a nut 212 screwed on the lower end of sleeve 210 for holding between said nut and the lower face of the lever 192 another sleeve 213, having a flanged upper end 214 that abuts the lower face of the supporting lever. Journaled on this sleeve 213 is a hub 215, on which is provided a housing 216 having mounted therein a pinion gear 217, fixed to a shaft 218 that is journaled in bearings 219 and 220. A paring knife disc 221, concave on its bottom side and provided with an annular cutting edge, is fixed to the bottom end of the shaft 218. The knife disc 221 is provided with a neck portion 222 that is engaged by an angle clip 223, which has one arm 224 (Fig. 7) forked and its opposite arm 225 fastened at 226 to the collar 207. There is another collar 230, fixed to the shaft 208, having forked arms 231, which project to engage the sides of the housing 216 to cause it, and the hub 215 of which it is a part, to be rotated on the sleeve 213, when the shaft 208 is rotated. A miter gear 232 is clamped against the bottom of the sleeve 213 by the nut 212 so that it is held fixed and non-rotatable, for a purpose hereinafter described.

The shaft 208 is slotted at 233, at its upper end, to slidably engage with splines 234 (Fig. 8) of a pinion gear 235, that is slipped on the end of the shaft 208 in position to have its hub portion 236 abutting the top end of the upper bearing 209 and be held on said shaft by a washer 237 interposed between the top of the shaft and the head of a screw 238 screwed to the shaft. The purpose of having the shaft slidably mounted in the gear 235 is so that it may be moved vertically to accommodate the different sizes of tomatoes that are to be cored. To hold the washer 237 normally against the top of the gear, a tension spring 239 is interposed between the bottom of the nut 212 and the top of the collar 230. Accordingly, the coring knife and the paring disc are yieldably held at variable distances from the lower face of the supporting lever, which readily permits tomatoes of varying size to be cored. The miter gear 232 is fixed against rotation, so that it will cause the rotation of the pinion 217, and the shaft 218, as the housing 216 is rotated by the forked arm 231 about the axis of shaft 208, thereby causing the paring disc to be operated concomitantly with the corer for paring or cutting a belt of skin from the top of the tomato.

There is fastened to the top side of the free end of the supporting lever 192 a housing 245, which encloses the pinion 235. A slot 246 (Fig. 8) is cut in the housing to accommodate a rack bar 247, which is slidable therein, having teeth 248 thereon meshing with the pinion 235. A cover 249 is fastened to the housing 245 for holding the rack bar 247 in place within the slot. A portion of the housing 245, adjacent the end of the rack bar, is cut away at 250 to permit the end of a driving arm 251 to be pivotally connected to the end of the rack bar 247 by a pin 252. The opposite end of the driving arm 251 is fixed to the end of a shaft 253, which is journaled in the bifurcated end 254 of a post 255, depending from the supporting lever 192. There is also fixed to the same shaft 253 the end of an arm 256, which carries, adjacent to its lower end, a roller 257 disposed to contact the face cam 180. The roller is positioned between two collars 258 adjustably mounted on said arm and secured by set screws 259. The two arms, 251 and 256, are in a straight line relationship, and together provide a driving connection between the face cam 180 and the rack bar 247, the driving connection being pivoted on the post 255. In order to permit free pivotal movement between the arm 251 and the rack bar 247, a slot 260 is provided in the arm 251, through which pin 252 extends.

It is clearly apparent from the foregoing description that, as the roller 184 rides in contact with the high and low points of the edge cam 183, the slide 186 will be reciprocated to rock lever 192 from the position shown in Fig. 6 to that shown in Fig. 7 and, then, after a pause, back to the position of Fig. 6. The lowering of lever 192 causes the coring blade 205 to penetrate the stem end of a tomato on ring 85, as indicated in Fig. 7. It also causes roller 257 to contact cam 180, whereby the revolving cam will rock arm 251 to reciprocate the rack bar 247 to rotate shaft 208 and operate the coring blade 205 and the paring disc 221. In order to have the roller 257 held in contact with the face of cam 180, when the supporting lever 192 is lowered to operative position, a tension spring 261 (Fig. 8) is connected at one end to the pin 252 and, at its opposite end, to another pin 262, which is fixed to the housing cover 250. However, this spring is also employed for the purpose of returning shaft 208, coring blade 205 and paring disc 221 to their normal starting positions, as shown in Fig. 6. This spring urges the rack bar 247, at all times, toward the free end of the supporting lever 192 and to the limiting portion of its movement against a stop provided by an end plate 265, which is held in place with respect to the housing 245 by a fastening means 266. The position of rack bar 247 against the end plate 265 determines the starting position of the coring blade. The movement of the rack bar 247, as determined by the depth between the high and low points of the face cam 180, is correlated with relation to the revolution of shaft 208 and the coring blade 205, so that the shaft 208 will make one and one half turns for each stroke of the rack bar 247.

In this connection, it is also very important to have the supporting lever 192 raised quickly to inoperative position following the coring operation so that the freed core, which has been cut from the stem end of the tomato, will be flipped out and ejected with sufficient force to be thrown clear of the machine. Accordingly, when the high point 181 of cam 180 contacts roller 257, slide 186 is raised and the spring 190 is at its greatest tension. It will be understood, of course, that, in raising slide 186, the supporting lever 192 is lowered to bring roller 257 into contact with the face cam 180. These two cams 180 and 183 are so arranged that in their operation the high points of the two are reached by their associated contact rollers at the same instant. Then, as the roller 184 leaves the low point of cam 183, the force of the spring 190, in being released from its greatest tension, will immediately snap the supporting lever 192 to its raised or inoperative position, and, at the same time, spring 261 will rotate shaft 208, coring blade 205, and paring disc 221, to their starting positions. Because of the snap action in returning this supporting lever 192 to inoperative position, a rubber bumper stop 267 is provided, held in proper position by a support 268, which is clamped to a standard 269 threaded into a bracket 270 and clamped by nut 271. Bracket 270 is fixed to one of the angle bars 30 of the frame 16.

It has been described above that the shaft 208, on which the coring blade 205 and housing 216 are mounted, is movable longitudinally for accommodating tomatoes of varying size. The shaft 218, on which the paring disc 221 is mounted, is movable longitudinally for the same purpose. The opening in the housing 216, in which the bearing 219 fits, is of sufficient diameter to permit axial movement of the long pinion 217. The coring blade 205 and the paring disc 221 are shown, in Fig. 7, raised against the tension of the spring 239, and these same elements are shown, in Fig. 6, lowered to their normal positions. The forked end 224 of the angle clip 223 functions to lift the shaft 218, when the coring shaft 208 is raised.

When the lever 192 is lowered to the position of Fig. 7, the coring-blade 205, which lies at an angle to the axis of shaft 208, and of the tomato, penetrates the stem end of the tomato, and the cutting edge of paring disc 221 engages the skin of the tomato adjacent the stem end. As cam 180 rotates, rack bar 247 is moved against the tension of spring 261, causing shaft 208 to rotate through one and a half turns. This causes coring blade 205 to cut a conical piece, including the stem, from the stem end of the tomato. At the same time, housing 216 rotates about the axis of shaft 208 causing paring disc 221 to traverse a circular path about the stem end of the tomato and, due to the meshing of pinion 217 with the fixed gear 232, shaft 218 and disc 221 rotate about their common axis, whereby a narrow belt or zone of skin, surrounding the stem, is cut from the tomato at the same time it is cored.

After the tomato has been cored, and pared around the stem end, and the freed core ejected, the cored tomato is lowered in place on the conveyor, which then resumes its movement to carry the cored tomato to the next operating station and bring another tomato, in front of the following flight, into position to be lifted from the conveyor to be cored by a repeated operation of the corer.

The next operations are to prepare the skin remaining on the tomato so that it can be readily removed by application of suction thereto, by slicing a relatively thin slice of skin from the bottom, or blossom, end of the tomato, and then slitting the skin along opposite meridian lines from top to bottom, substantially completely, leaving the skin adhering to the tomato in two diametrically opposite sections, that are roughly hemispherical. To effect this, the cored tomato is subjected to a bottom slicing, a top slitting and a side slitting operation.

The bottom or blossom end of the tomato is sliced off by a shearing blade 275 (Fig. 9), disposed at an angle to the line of movement of the conveyor, to give a shearing action as the tomato moves past the blade from the coring station. This shearing blade 275 is fixed, as by welding, to a metal frame 276 (Fig. 19), having lugs 277 bent to form hinge ears for the reception of a pin 278, which is pivoted near the bottom of a pair of standards 279, mounted on the base plate 81. A finger 280 has one end fixed to the pin 278 and its opposite end projecting substantially parallel with a similar finger 281, fixed to a pin 288, pivoted in the upper ends of standards 279, to which pin a support plate 283 for the top slitting blade 284 is attached. The blade 284 is clamped between two lugs 285, which project upwardly from the top of the supporting plate 283, and has its cutting edge portion projecting below the under-surface of the plate 283, at an angle thereto, to slit transversely through the top of the tomato as it is carried therebeneath by the conveyor. The top slitting blade 284 and the bottom slicing blade 275 are yieldably urged toward each other by a tension spring 286 having one end attached to finger 280 and its other end attached to finger 281. A stop 287 is provided for each of these fingers 280 and 281, to limit the extent of their movement toward each other. The stop 287 limits downward movement of blade 284 so that its lower corner is just above the horizontal plane of the uppermost portions of flights 10. The blade 284 is located midway between the vertical planes of the conveyor chains 8 and 9. The frame 276 is located between chains 8 and 9 with the blade-carrying portion thereof positioned by lower stop 287 substantially in the horizontal plane of the upper reaches of said chains. The purpose of yieldably urging the blades toward each other is so that they will adapt themselves for tomatoes of varying size. The metal frame 276 is centrally recessed at 288, with the bottom slicing blade 275 extending transversely, at an angle, across the recess. The width of this recess determines the extent to which the bottom or blossom end of a tomato, carried thereover by the conveyor, projects into the recess of the frame, thereby determining the thickness of the slice of the tomato to be removed by the blade.

The blade 275 removes a relatively thin slice from the bottom of the tomato, thus freeing the tomato skin at the blossom end thereof. Blade 284 slits the tomato skin, fore and aft, in a meridian plane midway between chains 9 and, hence, midway between the sides of the tomato, from a point slightly above the center upwardly to the edge of the cored and pared section. Referring to Fig. 20, the cored section is indicated at A, the belt of skin removed by cutting disc 221 is indicated at B, the part removed by the bottom slicing blade 275 is indicated at E, and the slits made by blade 284 are indicated at C1 and C2. It is to be noted that the after slit C2 is indicated as longer than the forward slit C1. This is because blade 284, as it leaves the tomato has a tendency to extend the slit downwardly by a splitting action on the skin.

Side slitting blade 300 (Figs. 9 and 14) is of the form of a disc saw having a plurality of sharp saw teeth on the periphery thereof. This disc or blade 300 is mounted on a pin 301 carried by the upper end of an arm 302, which extends upwardly midway between the vertical planes of chains 9 of the conveyor. Disc 300 may turn on pin 301 but there is sufficient drag thereon so that it is not freely rotatable on said pin. Arm 302 extends upwardly from hub 303, which is rotatably mounted on the reduced end 304 of a shaft 305, being secured thereon by washer 307 and cotter pin 306. Shaft 305 is adjustably mounted in a plate 308, secured to one of the angle irons 30 of the frame by means of a clamping nut 309 screwed on the threaded end 310 of said shaft. A depending pin 311 has its upper end 312 screwed into a socket formed in hub 303, and one end of a tension spring 313 is connected to the lower end of pin 311, while the other end of said spring is connected to a bracket fast on the main frame. Thus, spring 313 tends to rock arm 302 upwardly to the position shown in Fig. 9. Movement of arm 302 under the tension of spring 313 is adjustably limited by a stop screw 314, threaded into a bracket 315 secured to the frame, and positioned to be engaged by pin 311.

Fig. 9 shows the parts in the position they occupy while the conveyor is in motion between positions of rest. When the conveyor is at rest, a tomato in front of one of the flights 10 will be so positioned that its forward side is just about to engage the side slitting disc 300. When the conveyor starts in motion from this position of rest, the tomato will be carried against the side slitting disc 300 and one of the sharp saw teeth thereon will puncture the tomato skin at a point in the forward side approximately midway between top and bottom. Then, as the forward movement of the tomato continues and arm 302 is depressed against the tension of spring 313, this sharp tooth of disc 300, which has punctured the tomato skin, will slit or split the skin along the forward meridian line, indicated at D1 in Fig. 20, from the point of puncture to the forward edge of the slice E. As the tomato continues to move forward, the disc 300 will cut into the body of the tomato, slightly, at the point where the bottom slice E was removed, and as it leaves this portion one of the teeth of the cutting disc 300 will hook into the tomato skin at the rear lower side thereof and slit the skin upwardly along the meridian line indicated at D2 in Fig. 20.

The action of the coring knife 205, the paring disc 221, the bottom slicing knife 275, the top slitting knife or blade 284 and the side slitting disc 300 upon a tomato has been to substantially cut or slit the tomato skin to form two diametrically opposed, substantially hemispherical sections, entirely severed except for the small stretches between the lower end of slit C1 and the upper end of slit D1, and between the lower end of slit C2 and the upper end of slit D2 (Fig. 20). The skin has also been freed at the stem end and the blossom end so that, as a result of these operations, the skin is prepared or conditioned for subsequent removal in two sections by suction applied to diametrically opposite sides thereof.

The tomato having been cored, pared in a belt around the stem, sliced at the bottom, and having its skin slit into sections, is now ready for a steaming operation for loosening the slit skin sections so that they can be readily pulled off, in sections, by application of suction as hereinafter described. A steaming chamber, designated generally at 320 (Fig. 1b), is mounted on the frame 16 in position for the upper reach of the conveyor to traverse therethrough. This steaming chamber comprises a hollow tubular pipe 321 (Fig. 12), perforated with any number of holes 322. Opposite ends of the pipe 321 fit within an annular stepped recess 323 (Fig. 12) which is formed within the end collar 324. These end collars have an annular flange 325, internally threaded at 326 to be screwed on the ends of another tubular member 327, concentrically surrounding pipe 321, and sufficiently larger in diameter to provide a chamber 328 between the two tubular members 321 and 327. A closure is provided for sealing the opposite ends of the steaming chamber and yet permitting the conveyor to carry tomatoes therethrough. The closure, there being one for each end of the steaming chamber, comprises a disc 329 (Fig. 13) of any suitable flexible material, such as leather, rubberized fabric or the like, that is slit radially at 330 from its center 331 to points 332, the slits terminating short of the periphery of the disc. An opening 333 is cut out of the closure disc for each of the chains 9 to permit them to move through the chamber without allowing the escape of any substantial amount of steam. The free ends of the triangular flaps of the closure disc, between the radial slits 330, are flexible to permit the tomatoes and the flights of the conveyor passing through the chamber and yet sealing the ends thereof against any substantial loss of steam. The closure discs are secured in place on the opposite ends of the chamber by rings 334, which are clamped thereagainst by any number of fastening screws 335 that register with holes 336, punched in the closure discs. The chamber is insulated with any suitable insulating material 337 applied to cover the side wall and to extend down over the opposite ends to the openings in the rings 334. There is an inlet conduit 338 connected to a steam supply line for feeding steam therefrom into the intermediate chamber 328, where it has access to the interior of the pipe 321 through the perforated wall. Thus, the cored and slit tomatoes are subjected to a steaming atmosphere while being carried through chamber 320 by the intermittent movement of the conveyor.

Immediately after the cored and slit tomato has emerged from the steam chamber, it is subjected to a cold water shower. The steaming operation expands and loosens the slit skin, and the subsequent cooling treatment contracts it, thereby causing the slit skin to be further loosened and more easily removed by subsequent application of suction. The water bath also rinses any loose and foreign particles that may be clinging to the tomato. The water is applied to the tomatoes through a plurality of jets 342, disposed above the upper reach of the conveyor adjacent to the chains 9, which jets are connected to a water supply line 343. The water, after bing sprayed upon the tomatoes, is collected in a trough 344, underneath the conveyor, and drained away.

The tomato has now been prepared for skinning and is ready to have the loosened skin removed upon leaving the cold water shower. The loosened skins are removed in sections by vacuum applied to the sides of the tomato, suitable mechanism being provided for applying suction or vacuum to opposite sides of a tomato prepared as above described.

When the conveyor comes to rest, flight 10 presents a tomato, in front of it and resting on chains 9, at the skin removing station, between the free ends of pivoted wing plates or holders 375 and just above the spoon-shaped end 387 of a lifter member 385. The rear ends of the wing plates 375 are pivoted on vertical posts 400 fixed to the machine frame. In advance of the pivot, each wing plate has fixed thereto a laterally-extending lug 399, in which is mounted the upper end of a downwardly-extending rod 398 (Figs. 1c and 2c). The lower end of each rod 398 is pivotally connected with the forward end of a link 397, the rear ends of said links being pivotally connected together, and to a reciprocable bar 395, by a pin 396. The bar 395 is slidably mounted on the frame and extends rearwardly to a point adjacent shaft 109 (Fig. 1b). The rear end of bar 395 has an extension 405 (Fig. 9), adjustably secured thereto, and fixed in adjusted position by lock nut 407. Extension 405 is slotted at 408 (Fig. 11), to receive and be guided by shaft 109, and a roller 410 is journaled on stud 411, fixed to extension 405 by nut 412. Roller 410 engages edge cam 409 fixed on shaft 109, between cams 108 and 122. A compression spring 415, surrounding bar 395 (Fig. 9), is interposed between collar 413 secured to said bar and an abutment 416 fixed to frame 16, and urges roller 410 into engagement with cam 409. The configuration of cam 409 is such that, when the conveyor is in motion, a high surface of the cam overcomes spring 415 to hold bar 395 in its forward position, in which the wing plates 375 are spread apart so that the conveyor may carry a tomato between the free ends thereof. When the conveyor comes to rest, to present a tomato at an operating station, a low surface on cam 409 acts on roller 410 to allow spring 415 to move the bar 395 rearwardly, thus moving the free ends of wing plates 375 toward each other to apply vacuum cups 377, carried thereby, to opposite sides of a tomato at the skin removing station.

Lifter member 385 lies between, and slightly below, the upper reaches of conveyor chains 9 (Fig. 16) and the rear end of this lifter is fixed to a transverse pin 388 journaled in brackets 389 fixed on the angle members 30 of the machine frame. The lifter 385 extends forwardly from its pivot and has a spoon-shaped forward end 387. The upper end of a spring 390 is connected to a finger 391 projecting forwardly from pin 388 and the other end of the spring is anchored to the machine frame, so that spring 390 tends to hold lifter 385 in its lowermost position. The under side of the lifter has a cam surface 386 engaged by a roller 392 journaled on pin 393 carried by the upper end of a vertical post 394 fixed to the forward end of the reciprocable bar 395. When cam 409 allows spring 415 to move bar 395 rearward to move the free ends of wing plates 375 toward each other, the same movement of bar 395 cams the lifter member upwardly to lift a tomato, engaged by the spoon-shaped end 387, from the conveyor chains 9.

Each wing plate 375 carries, adjacent its free end, a short tube section 377, of elastomeric material, having a flared lip at its inner end, adapted to contact a tomato between the wing plates (Figs. 17 and 18). This tubular section 377 extends through the wing plate and is fastened thereto, and to a tubular section 378, likewise fixed to the wing plate. A smaller tube 381 extends within the tubular section 378 and is fastened thereto, and also extends within an external, collapsible, bellows-like tube section 380, one end of which is fastened to the outside of tubular section 378, while the other end surrounds and is fastened to a tubular section 379, connected to a conduit 376, leading to a source of suction. When the wing plates are in their clamping position, as shown in Fig. 18, the tube 381 nests in tubular setcion 379, tube 381 being provided to afford a smooth bore passage through which the skins may pass after removal from the tomato by the application of suction. Thus, it will be seen that each wing plate 375 carries what is, in effect, a vacuum cup, applied to the tomato when the wing plates move toward each other and engage it.

The conduits 376, leading from the vacuum cups on the two wing plates, connect with inlet ports of a valve 357 (Fig. 1c), the outlet port of which is connected by pipe 420 to a vacuum tank 421 (Fig. 1b), having a cover 422 held in sealing relation thereto by clips 423. Reduced pressure is maintained in tank 421 by an exhausting pump 424, connected to the tank by pipe 426, and driven by a motor 425 (Fig. 1a) suitably connected thereto. Conduit 100 (Fig. 6) is also connected to vacuum tank 421.

Means are provided for controlling valve 357 so that it will be open, to connect conduits 376 with the source of suction or reduced pressure, during certain portions of the cycle only, while a tomato is at rest between the wing plates 375. These valve-controlling means are such that the valve is prevented from opening if no tomato is at the skin removing station. Valve 357 has a controlling arm 362, the position of which determines whether the valve shall be open or closed, and the end of said arm is swiveled at 361 (Fig. 15) to one end of link 360. The other end of link 360 is connected to arm 359 of a bell crank pivoted at 363, the other arm 358 thereof being pivotally connected to the lower end of a control slide 355. This control slide 355 has a slot 356 in its upper end, through which shaft 367 passes, and the slide is mounted on the machine frame so as to be slidable vertically. Springs 372, connected to the slide and to the frame, tend to move it upwardly. A contact roller 370, journaled on stud 371 carried by the slide, is engageable with cam 366 fixed on shaft 367, on which the conveyor sprockets 13 are also fixed. Cam 366 has four high spots 368 and four low spots 369, alternately arranged, and, when roller 370 contacts a high spot, slide 355 will be held in its lower position, which, through the linkage, 358, 359 and 360 maintains the control arm 362 of valve 357 in closed position. If slide 355 is permitted to rise, under the pull of springs 372, until roller 370 contacts a low spot 369, the control arm 362 of valve 357 will be moved to position to open the valve. The timing of cam 366 is such, with reference to the conveyor travel, that valve 357 opens shortly after the conveyor stops and shortly before the wing plates 375 move toward each other to apply vacuum cups 377 to a tomato, and valve 357 closes, to cut off the suction, shortly before the wing plates 375 start to separate.

A shaft 350, journaled in brackets 351 and 352 on the frame, has fixed thereto a depending arm 353 with a foot 354 that normally overlies the upper end of slide 355, as shown in Fig. 15. Fixed to shaft 350 is an upwardly curved arm 348 carrying a tomato sensing shoe 345, comprising a strip 346, lying above the conveyor chains 9 and midway between them at a height to engage a tomato on the chains. The rear end of the strip is curved upwardly so that, as the conveyor moves a tomato to the skin removing station, the tomato will cam shoe 345 upwardly, thus rocking shaft 350 to remove foot 354 from the path of slide 355. This permits springs 372 to move slide 355 upwardly to open valve 357, as a low spot on cam 366 comes opposite roller 370. If the conveyor does not present a tomato at the skin removing station, foot 354 will block slide 355 and prevent the opening of valve 357 and the connection of cups 377 with the source of suction.

After the skin has been removed from the tomato, it is ready to be disposed of by being collected in a container or transferred elsewhere. The apparatus embodying the present invention is especially useful in factories for canning or processing tomatoes, and the tomatoes prepared as above described are now ready for canning or other processing operations.

A clutch mechanism 430, of any conventional construction, is associated with the sprocket 60 on the shaft 61. This clutch is provided so that the machine can be rendered operative or inoperative at will, and it is operated by a handle 431 connected to the clutch operating lever 432 by any suitable means.

In the operation of the above described machine, a supply of tomatoes is dumped into the tank 2, substantially filled with water, or other suitable liquid, such as a brine, at the receiving end of the machine (Fig. 2a) where the tomatoes float on the surface of the liquid with their stem ends up. The floating tomatoes are urged by the circulation of the liquid within the tank toward the channel defined by walls 3 and 4a, in which the rear end of the conveyor is disposed partially submerged in the liquid in the channel portion of the tank. The tomatoes are picked up by the conveyor, one by one from the tank, in front of individual flights, stem end up, to be moved in sequence thereby to the various operating stations.

At the coring station, the tomato is lifted by the post 83 from the conveyor and held by suction in the seat on ring 85 at the top of said post. As the tomato is being lifted from the conveyor, the jaws 160 move into position to contact its opposite sides for aligning it vertically. It is further held by engagement of wing plates 150 therewith. When so lifted and held, the coring blade 205 and the paring disc 221, are lowered (Fig. 7) in position for the coring blade 205 to penetrate the stem end of the tomato and for the paring disc 221 to engage the top surface. The coring blade 205 is rotated about shaft 208 by the driving mechanism from the face cam 180, it being driven as the roller 257 contacts the face of said cam moving from the low to the high points. This travel of the cam turns the coring blade 205 one and a half revolutions from its starting position, thereby allowing the blade to cut out the core and to be in a position to flip the cut core out of the tomato and clear of the machine when the supporting lever 192 is raised (Fig. 6) by the spring 190. The spring raises the supporting arm as soon as the high point of the cam 183 has passed. As the coring blade 205 revolves, the paring disc 221 also rolls about the top of the tomato thereby paring therefrom a belt of skin surrounding the stem end. These operations take place while the conveyor is at rest. Before it starts again, the post 83 descends, lowering the tomato on the conveyor chains, cutting off suction from ring 85, and opening jaws 160, and the wing plates 150 separate.

The core having been cut out and removed from the tomato, and a belt of skin having been pared therefrom surrounding the stem, the conveyor carries the tomato over and past the bottom slicing blade 275, which removes a thin slice from the bottom or blossom end of the tomato, thereby freeing the skin at that point. The conveyor also carries the tomato past the top slitting blade 284, which slits the tomato skin, fore and aft, in the upper meridian cuts indicated at C1 and C2 in Fig. 20. At about the same time, the movement of the tomato with reference to the side slitting disc 300 slits the tomato fore and aft in the lower meridian cuts D1 and D2. As the result of the action of these devices, the tomato skin is freed at top and bottom and slit substantially into two diametrically-opposed, hemispherical sections, which remain connected by relatively small areas of skin.

The conveyor next carries the tomato through the steaming chamber 320, in which it is scalded to loosen the skin by steam in the chamber. Upon leaving this steaming chamber, the conveyor carries the tomato between the cold water sprays 342, which cool it, help to loosen the skin, and remove any foreign matter. Upon leaving the cold water sprays, the tomato is carried by the conveyor to the skin removal station and when the conveyor comes to rest, a tomato in front of a flight 10 rests on the forward end of the lifter member 385, by which it is lifted from the chains. The wing plates 375 are then caused to move toward each other, so that the cup-shaped ends of the vacuum conduits 377 are applied to opposite side faces of the tomato and, said vacuum conduits being connected momentarily with a source of suction, such suction separates completely the two skin sections and removes them from the tomato, the skin sections passing off through vacuum conduits 377, 376, valve 357 and pipe 420 to vacuum tank 421, in which the skins accumulate and from which they may be removed, as required, by opening the top of the tank. At the completion of this skin removing operation, the conveyor delivers the skinned and cored tomato at the delivery end of the machine.

It is understood that there may be various changes in details of construction of the above described machine without departing from the spirit of the invention which is limited only by the appended claims.

Having thus described the invention, what is claimed as new and useful and desired to secure by United States Letters Patent, is:

1. In a machine of the class described, an automatic coring mechanism comprising the combination of a supporting lever pivoted to rock about a horizontal axis, means for rocking said lever automatically about its pivot to and from operative position, said means for rocking the lever including a gear segment formed on one end of the lever and a vertically slidable rack meshing with said gear segment, a coring shaft extending through and rotatable in said lever, means for rotating said shaft automatically, a member fixed to the lower end of said shaft, and a coring blade having its point on the projected axis of said shaft and its base secured to said member at a point remote from said axis.

2. The combination of claim 1 including spring means connected to said rack and tending to move it in one direction, a cam follower carried by the rack, and a driven cam engaging the follower and active to move the rack in the other direction.

3. The combination of claim 1 in which the coring shaft is mounted in the lever so as to have axial movement and including spring means for moving said shaft axially in one direction, said shaft being shiftable against the force of said spring means by engagement with the top of an object to be cored as the lever rocks to operative position.

4. The combination of claim 1 in which the means for rotating the coring shaft is adapted to be rendered effective when the supporting lever is rocked to operative position.

5. In a machine of the class described, mechanism for paring a belt of skin from around the stem of a tomato comprising the combination of a supporting lever pivoted to rock about a horizontal axis, means for rocking said lever automatically about its pivot to and from operative position, a housing carried by said lever and rotatable about an axis extending transversely thereof, means for rotating said housing about said axis, a paring shaft journaled in said housing and rotatable about an axis remote from said first axis and extending at an angle thereto, a paring cutter fixed to the lower end of said shaft, and means for rotating said shaft automatically.

6. The combination of claim 5 in which the means for rocking the supporting lever include a gear segment formed on one end of the lever and a vertically slidable rack meshing with said gear segment.

7. The combination of claim 6 including spring means connected to said rack and tending to move it in one direction, a cam follower carried by the rack, and a driven cam engaging the follower and active to move the rack in the other direction.

8. The combination of claim 5 in which the paring shaft is axially shiftable in said housing, and including spring means for moving said shaft axially in one direction, said shaft being shiftable against the force of said spring means by engagement with the top of a tomato as the lever rocks to operative position.

9. The combination of claim 5 in which the means for rotating the paring shaft is such that it is rendered effective by rocking the supporting lever to operative position.

10. The combination of claim 9 in which the means for rotating the paring shaft include a shaft rotatable about the axis of rotation of said housing, a pinion non-rotatably connected with said last-mentioned shaft, a rack meshing with said pinion, and means for reciprocating said rack.

11. The combination of claim 10 including a spring connected to move said rack in one direction and a driven cam effective, when the lever is in operative position, to move the rack in the opposite direction.

12. The combination of claim 11 including an arm pivoted on the supporting lever and having its upper end connected to said rack, and a cam follower carried by the lower end of said arm and so positioned as to be moved into operative engagement with said cam when the lever is rocked to operative position.

13. The combination of claim 5 in which the means for rotating said housing about said axis include a shaft journaled to rotate about said axis, means for rotating said shaft, and a member fixed to said shaft and engaging said housing to compel it to rotate about said common axis with said shaft.

14. The combination of claim 13 in which the means for rotating the paring shaft include a fixed gear coaxial with the axis of rotation of the housing, and a pinion non-rotatably connected to the paring shaft and meshing with the fixed gear.

15. In a machine of the class described, a coring and paring mechanism comprising the combination of a supporting lever pivoted to rock about a horizontal axis, means for rocking said lever automatically about its pivot to and from operative position, a coring shaft extending through and rotatable in said lever, means for rotating said shaft automatically, a member fixed to the lower end of said coring shaft, a coring blade having its point on the projected axis of the coring shaft and its base secured to said member at a point remote from said axis, a housing carried by said lever and rotatable about the axis of said coring shaft, a paring shaft journaled in said housing and rotatable about an axis remote from the coring shaft axis and extending at an angle thereto, a paring cutter fixed to the lower end of said paring shaft, and means for rotating said paring shaft automatically.

16. The combination of claim 15 in which the means for rotating the housing about the axis of the coring shaft include a member fixed to the coring shaft and engaging the housing to compel it to turn about said axis with the coring shaft.

17. The combination of claim 16 in which the means for rotating the paring shaft include a fixed gear coaxial with the coring shaft, and a pinion meshing with said gear, coaxial with said paring shaft and non-rotatably connected therewith.

18. In a machine of the class described, an automatic coring mechanism comprising the combination of a supporting lever pivoted to rock about a horizontal axis, means for rocking said lever automatically about its pivot to and from operative position, said means including a gear segment formed on one end of the lever and a vertically slidable rack meshing with said gear segment, a coring shaft extending through and rotatable in said lever, means for rotating said shaft automatically, a member fixed to the lower end of said shaft, and a coring blade having its point on the projected axis of said shaft and its base secured to said member at a point remote from said axis, said means for rotating the coring shaft including a pinion non-rotatably connected to said shaft, a rack meshing with said pinion and means for reciprocating said rack.

19. The combination of claim 18 including a spring connected to move said rack in one direction and a driven cam effective, when the lever is in operative position, to move the rack in the opposite direction.

20. The combination of claim 19 including an arm pivoted on the supporting lever and having its upper end connected to said rack, and a cam follower carried by the lower end of said arm and so positioned as to be moved into operative engagement with said cam when the lever is rocked to operative position.

References Cited in the file of this patent

UNITED STATES PATENTS

| | | |
|---|---|---|
| 1,347,385 | Kirino | July 20, 1920 |
| 1,923,712 | Deitz | Aug. 22, 1933 |
| 1,982,779 | Ayars | Dec. 4, 1934 |
| 2,076,496 | Deitz | Apr. 6, 1937 |
| 2,252,951 | Urschel et al. | Aug. 19, 1941 |
| 2,286,649 | Rogers | June 16, 1942 |
| 2,350,496 | Davis | June 6, 1944 |
| 2,605,882 | Curtis | Aug. 5, 1952 |
| 2,716,480 | Dotta | Aug. 30, 1955 |